United States Patent
McCormack et al.

(10) Patent No.: US 6,295,527 B1
(45) Date of Patent: Sep. 25, 2001

(54) REAL-TIME USER-DEFINED CREATION OF NETWORK DEVICE INFORMATION COLLECTIONS

(75) Inventors: John McCormack, San Jose; Mark Sapsford, Sunnyvale; Vidya Babu, Saratoga, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/023,598

(22) Filed: Feb. 13, 1998

(51) Int. Cl.[7] .............................. G06F 7/00; G06F 17/30
(52) U.S. Cl. .............................. 707/3; 707/10; 707/103; 707/104; 709/219; 709/224
(58) Field of Search .................... 707/10, 103, 2, 707/3, 6; 709/223, 218, 219, 222, 224; 700/121

(56) References Cited

U.S. PATENT DOCUMENTS

| | | | | |
|---|---|---|---|---|
| 5,261,044 | * | 11/1993 | Dev et al. | 395/159 |
| 5,388,259 | * | 2/1995 | Fleischman et al. | 395/600 |
| 5,796,951 | * | 8/1998 | Hamner et al. | 395/200.53 |
| 5,813,009 | * | 9/1998 | Johnson et al. | 707/100 |
| 5,963,938 | * | 10/1999 | Wilson et al. | 707/4 |
| 6,006,214 | * | 12/1999 | Carvey et al. | 707/2 |
| 6,009,466 | * | 12/1999 | Axberg et al. | 709/220 |
| 6,023,696 | * | 2/2000 | Osborn et al. | 707/3 |
| 6,078,924 | * | 6/2000 | Ainsbury et al. | 707/101 |

* cited by examiner

Primary Examiner—Thomas Black
Assistant Examiner—Jacques Veillard
(74) Attorney, Agent, or Firm—Hickman Palermo Truong & Becker LLP; Christopher J. Palermo

(57) ABSTRACT

Mechanisms for establishing and viewing groups of devices within a network of devices are disclosed. A filter mechanism is coupled to a database of information about devices in a network having multiple network devices such as switches and routers. The database stores a filter metadata table that describes criteria by which the information in the database can be filtered to establish groups of the devices. The filter metadata drives the presentation of a filter dialog that provides a set of filters and filter criteria that can be selected by a user. The filter mechanism receives a set of user-entered criteria, selected from among the filter criteria, that define a group of the devices. The filter mechanism constructs a Boolean query to the database based upon the user-entered criteria. The database provides a dynamic view of network devices that meet the user-entered criteria. The filter metadata table describes the order of filters displayed in the filter dialog, and sources of data that provide values for the filters to be displayed in the filter dialog. Filters are persistently stored and can be retrieved and viewed by name. The membership of each device group defined by a filter is dynamically evaluated when a view is requested for a filter. The mechanisms are data-driven and can accommodate different devices as well as changes in existing devices and introduction of new devices. The invention also encompasses a method, computer program product, and computer data signal embodied in a carrier wave that are configured to carry out the processes accomplished by the mechanisms.

54 Claims, 7 Drawing Sheets

REAL-TIME USER-DEFINED CREATION OF NETWORK DEVICE INFORMATION COLLECTIONS

FIELD OF THE INVENTION

The present invention generally relates to management of computer networks, and relates specifically to selecting and viewing information about groups of network devices.

BACKGROUND OF THE INVENTION

A computer network generally includes a number of devices, including switches and routers, connected so as to allow communication among the devices. The devices are often categorized into two classes: end stations such as work stations, desktop PCs, printers, servers, hosts, fax machines, and devices that primarily supply or consume information; and network devices such as switches and routers that primarily forward information between the other devices. Each of the devices has one or more circuit boards, a microprocessor and a memory, and runs a control program. The network devices are ordinarily operated continuously. Accurate information about the status of a device, its characteristics, and other information must be available on a continuous basis in order for a network administrator to properly maintain such a network.

Management of a large, complicated network made up of diverse devices is made easier by mechanisms that allow information about devices in the network to be viewed at a workstation. For example, it is desirable to know the name, manufacturer, software version, and other information about each device in the network. It is highly desirable to obtain this information in an automated way at a workstation, without requiring a manager to walk around the network and physically examine each network device.

Network management systems address this general need. To monitor the status of a device in the network, a network management station transmits a message requesting information to a software program or agent running on the target device. In response, the agent sends a message back to the network management station. The communications are carried out according to an agreed-upon protocol, such as the Simple Network Management Protocol (SNMP). The communications can be done over the network ("in-band") or by directly contacting a device through means separate from the network in which the device is used ("out of band"). In some configurations, the management station sends a request for information to a proxy rather than the actual device; the proxy then interacts with the device to decide what the response should be, and replies to the management station.

Networks usually consist of many different types of data switching and routing devices. Each device can have different physical characteristics. New devices, with characteristics that are presently unknown, are constantly being developed. In addition, the characteristics of many network devices may change over time. For example, characteristics of the network devices change when subsystems like boards, network interface modules, and other parts are added or removed from a device. However, maintaining a network requires network administrators and managers to have up-to-date network device information constantly at their fingertips. This need is complicated by the fact that most networks operate continuously, and it is not practical to turn the network or a device off in order to learn the status of a device.

One approach is to provide a network management system that presents a graphical view of the arrangement and interconnections of network devices on the screen of a workstation. The network is represented as a set of miniature icons, each of which represents a network device, interconnected by lines that represent electrical connections. An example of such a system is the Cisco Works for Switched Internetworks (CWSI) product available from Cisco Systems, Inc., of Santa Clara, Calif. However, the geographic scope of a network can present other difficulties in using this type of network management tool. A network can connect multiple buildings of an office campus, or multiple facilities in different cities. Networks of this type often have thousands of devices. As a result, it is impractical to view a graphical representation of the entire network. Therefore, it is desirable to establish groups of devices in the network and to provide a view of only devices that are in each group.

Past approaches generally have offered only static views of a network, in which the members of a group or view are statically tied to a group identifier. The user can request and display the members of a group, but the user cannot specify the way that group membership is determined.

Another past approach is to provide a limited form of dynamic view, in which the user can specify members of a view that are statically tied to the view. For example, the user can create a view called "Finance" that contains, as members of the view, information about network devices located in the Finance department of an organization. However, the devices are statically tied to the view, and when the network configuration is changed the user must manually update the view to add or delete new members. It is highly desirable to respond to requests to perform an operation involving a group of devices by resolving the devices that are in the group at the time the requests are made.

Based on the foregoing, there is a clear need for mechanisms of establishing groups of devices in a network and viewing network device information that are adaptable to a rapidly changing network environment.

It is also desirable to have a mechanism that can accept a definition of the elements to be displayed in a view and dynamically determine the members of the view.

There is also a need for a mechanism that can receive a set of filtering criteria that define elements to be displayed in a view. It is also desirable to have a viewing mechanism for network device information that can flexibly provide views of the network device information, in a way that is extensible to new kinds of network devices and information.

It is also desirable to have a network information grouping system that can establish groups of devices in a network defined by criteria that devices in the device group must satisfy.

It is also desirable to have such a network information grouping system that can persistently store information about the groups, such as the criteria that must be satisfied for membership in a group, in one or more persistent storage mechanisms, for example as data in a file or tables in a relational database.

It is also desirable to have a network information collection system that can determine current membership of devices in a group dynamically and in response to requests to perform operations involving a group of devices.

SUMMARY OF THE INVENTION

In one aspect, the invention provides a method for establishing groups of logical objects, the method comprising the steps of storing group criteria data that represents available criteria that may be used to define one of the groups; receiving user input that defines one of the groups by specifying a subset of the group criteria data that logical objects in the group must satisfy; responding to a request to view that group by determining current membership of that group by retrieving the group criteria data from the database and comparing the subset of the group criteria data against device data about all the logical objects.

One feature of this embodiment includes the steps of establishing one or more user-defined fields within the group criteria data for specifying information about the objects; and receiving user input that specifies particular values for the user-defined fields for particular objects among all the objects. According to another feature, the step of receiving user input that defines the group includes the step of receiving user input that specifies criteria for at least one of the user-defined fields. According to another feature, the step of persistently storing group criteria data further comprises the step of storing a table of metadata that describes the group criteria data.

Still another feature is that the step of storing a table of metadata further comprises the step of storing in the table of metadata a plurality of filters for information about the logical objects. Yet another feature is that the step of storing a plurality of filters further comprises the steps of storing, for each filter defined in the table of metadata, an order of display value, a filter label value, and a reference to a data source for values of the filter. Another feature is that the step of storing a reference to a data source for the values comprises the steps of storing, for each filter defined in the table, a table name that identifies a filter value source table and a column name that identifies a column of the filter value source table from which the values of the filter are derived.

According to another feature, the step of receiving user input comprises the step of receiving a user selection of a plurality of the filters that are related by Boolean logic. Still another feature is that the step of responding to a request to view the device group by determining current membership of the group includes the steps of building a list of the plurality of filters, the list comprising, for each filter in the plurality of filters, a filter identifier and a filter value; associating the plurality of filters with a Boolean logical relationship; and constructing a structured query language statement using the plurality of filters and the Boolean logical relationship.

In still another feature, the step of comparing the subset of the group criteria data includes the steps of applying the structured query language statement to the database; receiving, in response thereto, a result list comprising a plurality of pairs of device names and device identifiers of logical objects that are in the group.

Another aspect of the invention provides a method for establishing groups of devices in a network, the method comprising the steps of receiving user input that defines a device group by specifying particular criteria that devices in the device group must satisfy; persistently storing group criteria data that represents the particular criteria in a database; responding to requests to perform operations involving the device group by determining current membership of the device group by retrieving the group criteria data from the database; and comparing the group criteria data against device data about devices that currently exist in the network.

One feature of this aspect is the further steps of establishing one or more user-defined fields for specifying information about the devices; and receiving user input that specifies particular values for the user-defined fields for particular devices in the network. Another feature of this aspect is that the step of receiving user input that defines a device group by specifying particular criteria includes the step of receiving user input that specifies criteria for at least one of the user-defined fields.

In another aspect, a method for displaying views of logical objects that are members of logical groups comprises the steps of storing a plurality of a group definitions, each group definition defining one of the logical groups, each group definition comprising a set of properties that members of the logical group must satisfy for membership within the logical group; selecting one of the group definitions; requesting a view of current members of the selected group definition; determining the current members of the selected group by retrieving the properties of the group definition of the selected group, and applying a query based on the properties to a set of information about the logical objects; and displaying the view using a subset of the information received in response to the query.

The invention also encompasses a computer-readable medium, a computer data signal embodied in a carrier wave, and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for network device information collection and change detection is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OPERATIONAL CONTEXT

Generally, in one embodiment, a filter mechanism builds a filter dialog based on values of filter attributes stored in a Filter Metadata table. The values in the Filter Metadata table determine the order of columns in the filter dialog, their labels, and an association of a second table and a column within the table. A user selects filters using the filter dialogue. A query is constructed based upon the filters that are selected. The query is applied to a database of network device information. Based upon the results of the query, a view of a group or collection of selected network devices is constructed and presented to the user. The Filter Metadata table is stored in persistent storage, but can be modified to accommodate changes in the definition of filter criteria. New filters can be added without modifying the structure of the metadata.

In another embodiment, a user selects a dynamic view by choosing its group name. Each group name is associated with one or more filters. The values in the Filter Metadata table and associated tables are used to construct a query. The query is applied to a database of network device information. Based on the results, a view of devices in the group is constructed and displayed. Thus, the members of each group are evaluated and determined dynamically each time the group is selected or invoked.

In one embodiment, the filter mechanism generally is useful in the context of a computer program, such as a Device Finder tool or component that is used to locate information about devices in the network. For example, a Device Finder can incorporate the filter mechanism, or be linked to the filter mechanism. The Device Finder or the filter mechanism are incorporated into or linked to an application program that provides a device view function. In another embodiment, the filter mechanism is a stand-alone process that runs in a background mode, and is called by an application when filter operations are needed. In describing these embodiments herein, it is convenient to refer to the application as "the calling program" or "an external program."

Other applications include network configuration, network device performance data analysis, network traffic analysis, network device monitoring, network device availability management, and any other network application that can manipulate more than one network device at a time.

Figure 1:
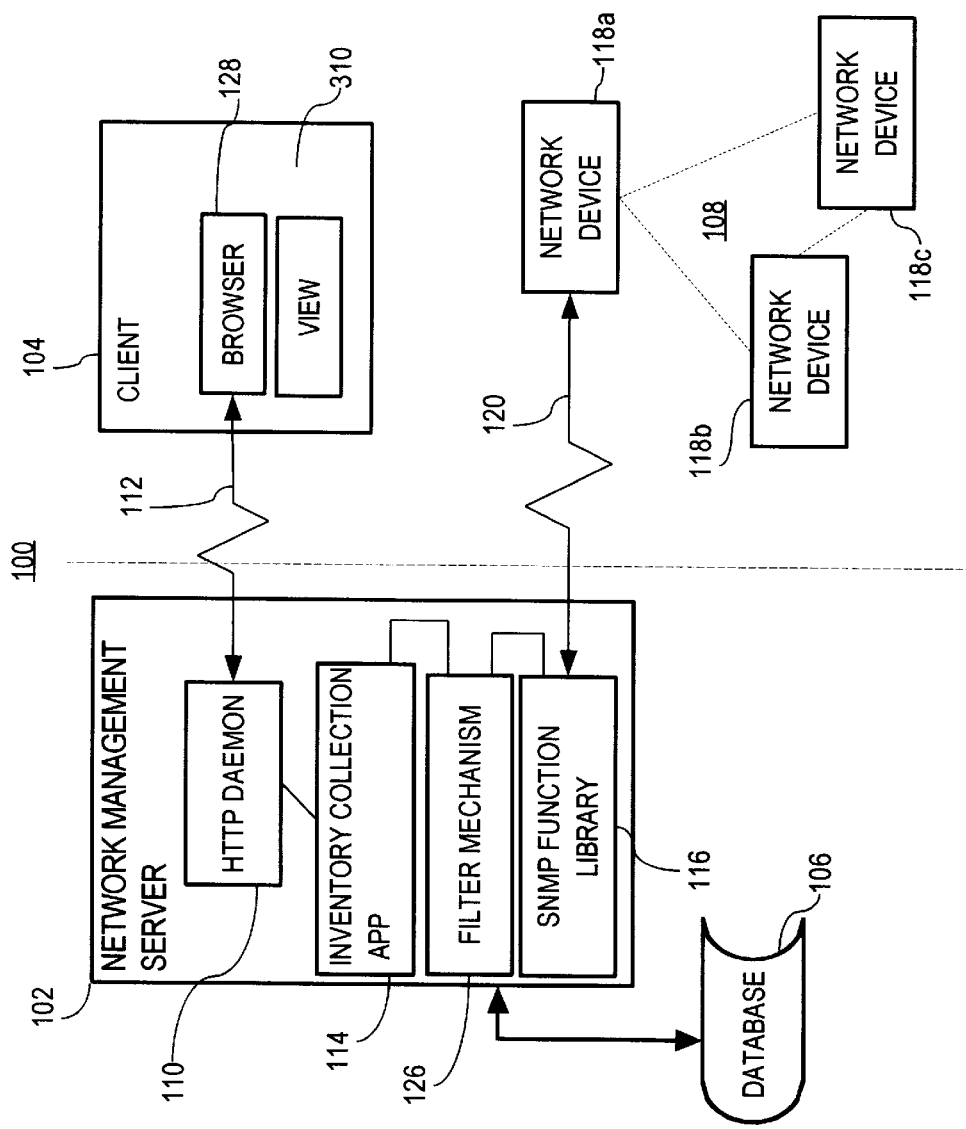
FIG. 1 is a block diagram of a computer system architecture in which the present invention may be utilized.

FIG. 1 is a block diagram of a data processing system 100 in which the invention can be used. Generally, the system 100 includes a network management server 102, a client 104, a database 106, and a network 108. The network management server 102 is a computer system, or a group of hardware or software components or processes operating in a computer system. The network management server 102 has a Hypertext Transfer Protocol (HTTP) daemon 110 that can respond to a request from the client 104 to establish an HTTP connection 112 between the server 102 and the client 104. The HTTP connection 112 is a data communications channel that uses a local area network (or "intranet") as a backbone. Alternatively, the HTTP connection 112 is established using the global data communication network known as the Internet as an intermediate communication channel. HTTP is merely an example of a communications protocol that can be used in an embodiment. Any other protocol that facilitates exchange of arbitrary information among a client and server can be used.

Although one client 104 is shown in FIG. 1 by way of example, any number of clients can be included in the system 100, and multiple HTTP connections 112 can be used to connect the clients to the network management server 102.

The network management server 102 also runs application programs, such as an Inventory Collection application 114. The application 114 provides a back-end, server-side mechanism for supervising operations relating to views of information about the network 108 that are requested by the client 104. The application 114 is coupled to a filter mechanism 126 that is described in detail below. Inventory collection is merely an example of the functions that can be provided by the application 114.

The network management server 102 also has an SNMP Function Library 116 that can communicate using an SNMP connection 120 with network devices 118*a*, 118*b*, 118*c* in the network 108. The SNMP Function Library 116 is a set of functions, subroutines, or objects that enable other programs, such as the application 114 and filter mechanism 126, to communicate using SNMP commands and instructions. In an embodiment, the SNMP Function Library 116 has a published Application Programming Interface (API). Thus, an application program can call functions in the SNMP Function Library 116 by assembling appropriate parameters and then calling a function named in the API using the parameters. The SNMP connection 120 is established over a network that is the same or separate from the network used for the connection 112.

The network 108 is a network comprising any number of network devices 118*a*, 118*b*, 118*c* interconnected by one or more communications channels. Ethernet, Token Ring, and other protocols can characterize the communications channel. The network devices 118*a*–118*c* are routers, switches, and other backbone devices that guide data communications among clients and servers.

The client 104 is a computer system, program or process that runs a World Wide Web browser 128 or other program that can communicate with the HTTP daemon 110 over the HTTP connection 112. The client 104 runs local application software that uses the information collected by the filter mechanism 126 from the network 108. The client 104 also has local storage and display capability for network device views 310.

The database 106 is a database server or database system, such as a Sybase® or Oracle® database server and associated components. The database 106 manages data tables that store information collected from the network 108 and information needed by the filter mechanism 126 to interpret the information collected from the network 108. The network devices 118*a*–118*c* from which information is collected are also called "managed devices" because they are under management of the filter mechanism 126 and the application 114.

The database 106 is merely exemplary. Any persistent store may be used as an alternative, such as a flat file, object store, or others. More than one persistent store can be used. The device data and the filter metadata can be stored separately.

The invention is not limited to the context shown in FIG. 1, and the spirit and scope of the invention include other contexts and applications in which the functions of the filter mechanism described herein are available to another mechanism, method, program, or process.

FILTER MECHANISM SCHEMA

Figure 2:
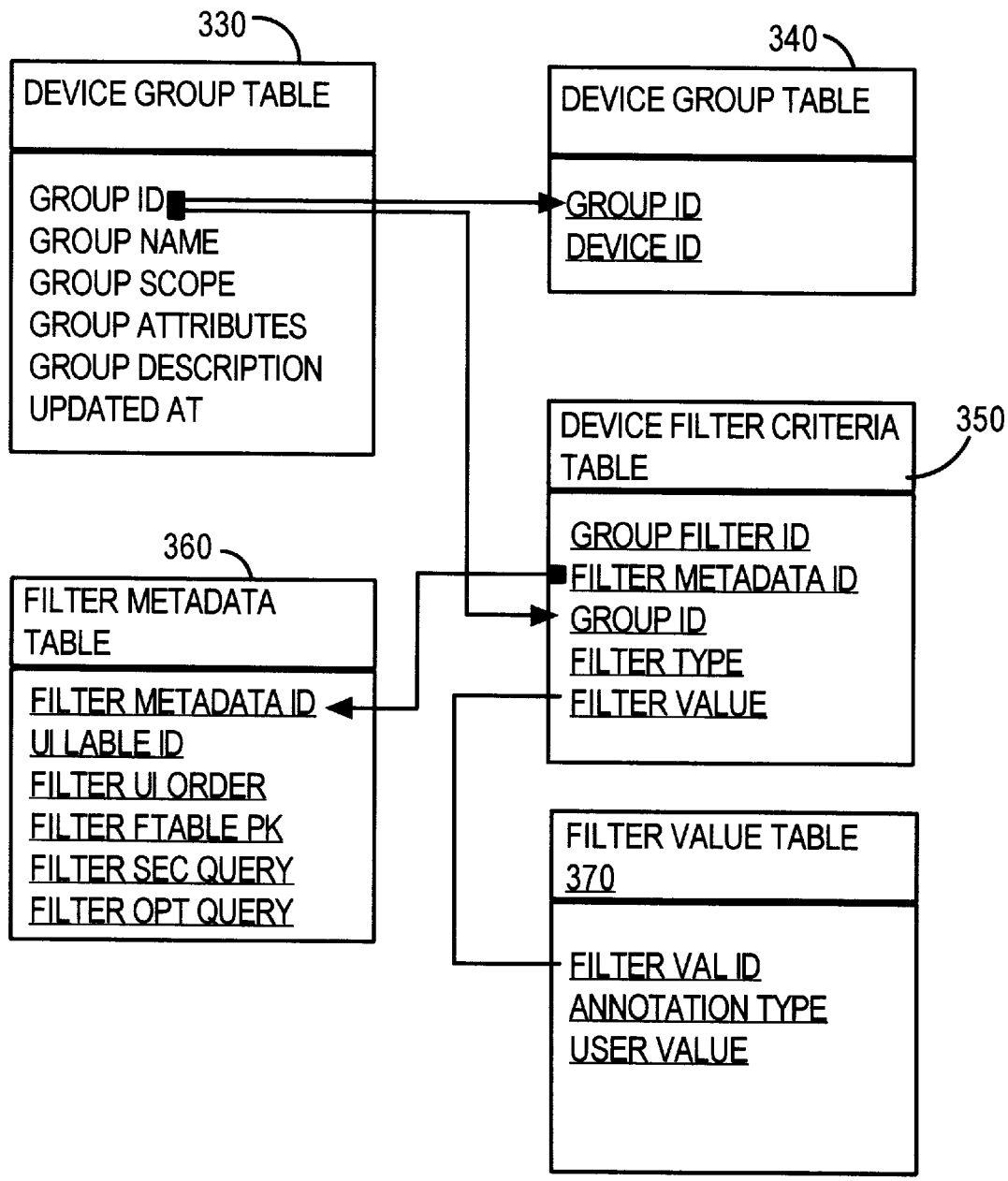
FIG. 2 is a block diagram of a filter mechanism table schema.

FIG. 2 is a block diagram of a Filter Metadata table 360, and related tables, that are stored in and managed by the database 106 so as to be accessible to the filter mechanism 126. In the preferred embodiment, the schema shown in FIG. 2 provides fundamental data structures used by the filter mechanism 126 to carry out filter functions. The filter functions are managed using the Filter Metadata table 360, a Device Group table 330, a Group Members table 340, a Group Filter Criteria table 350, and a Filter Value table 370.

Each row of the Filter Metadata table 360 stores information that represents and describes a filter. In the preferred embodiment, the Filter Metadata table 360 has columns named Filter Metadata ID, UI Label ID, Filter UI Order, Filter Ftable PK, Filter Sec Query, and Filter Opt Query. The specific information stored in the Filter Metadata table 360 is not critical, as long as it provides a clear description of a filter. In other embodiments, different information is stored. For each filter, the Filter Metadata ID column stores a unique identifier value. The identifier value is used as a key by the filter mechanism 126 to facilitate lookups of related information in other tables.

The UI Label ID column stores an identifier for the filter that is displayed in a filter dialog that is discussed further below. This enables the table to store an internal Filter Metadata ID in any desired format, but ensures that the user interface displays a meaningful identifier to the user. In an alternate embodiment, the UI Label ID column stores a row identifier for a table of user interface labels.

The Filter Ftable PK column stores a primary key value that is applied to a device information table to yield values defined by the filter. The Filter Sec Query and Filter Opt Query columns store queries that are used to generate primary and secondary result sets of device information for the filter. In the preferred embodiment, each of the query columns stores a text statement in SQL syntax that can be directly applied to a table.

The Device Group table 330 stores information about each group of devices that is defined by a filter. Each row in the Device Group table represents a definition of a group of devices. The Device Group table 330 has columns named Group ID, Group Name, Group Scope, Group Attributes, Group Description, and Updated At. The Group ID column stores a unique identifier associated with a group. The value of the Group Identifier column is assigned and used internally. The Group Name column stores a descriptive name for the group. An example of a Group Name value is "Router 5000 series." The Group Description column stores a text description of the contents of the group. An example of a Group Description value is "All the 5000 class routers." The Updated At column stores a time stamp indicating the last time that the other columns of the group were modified.

The Group Scope column stores a value that indicates whether the group is visible to users. This enables the system to include some groups that are used internally by the system and are not visible to users, and therefore cannot be modified or used by users. The Group Attributes column stores a value that indicates whether the group can be modified by users. The Group Attributes value enables the system to have pre-defined groups, such as the All group, that cannot be modified by users.

Each row of data in the Filter Metadata table 360 represents a filter by which a subset of information about network devices can be selected from a database that stores a superset of information about network device. The subset of information is also called a "collection", and when the subset is displayed to a user, it is convenient to refer to the subset as a "view" of network device information. Also, in this description, it is convenient to refer to a row of the Filter Metadata table 360 as a "filter" since each row represents characteristics of a filter. Each column in a row of data in the Filter Metadata table 360 provides information that defines the filter represented by that row.

The Device Group table 330 can refer to groups of devices that have static members and groups of devices that have dynamically determined members.

When a group has a static set of members, information about the members in the group is stored in the Group Members table 340. The Group Members table 340 has columns named Group ID and Device ID. Each row of the table stores information about one device that is a member of a static group. The Group ID column stores a value matching one of the group identifiers stored in the Device Group table 330. The Device ID column stores a value that identifies a device in the network. Thus, the Group Members table 340 provides a list of devices in which the rows with the same Group ID enumerate the devices that make up a static group.

When a group contains dynamic members, information about the group and how to generate it is stored in the Group Filter Criteria table 350. Each row in the Group Filter Criteria table 350 represents a test that forms a part of a query applied to a device database to yield a dynamically generated group of members. The Group Filter Criteria table 350 has columns named Group Filter ID, Filter Metadata ID, Group ID, Filter Type, and Filter Value. The Group Filter ID column stores an identifier of one or more filters used to generate members of a group. The value of the Group Filter ID is non-unique with respect to all groups, and unique with respect to a particular group. For example, when the Group Filter ID is a numeric value, multiple groups will have Group Filter ID values of "1," since every group must have at least one filter. The Filter Metadata ID column stores a unique value that serves as a key to the Filter Metadata table 360. The Group ID column stores a value keyed to the group identifiers stored in the Device Group table 330. Thus, for a particular group identified in the Device Group table 330, all the filters applicable to that group can be located by matching the Group ID to rows of the Group Filter Criteria table 350.

The Filter Type column of the Group Filter Criteria table 350 store values indicating the type of test to be applied to a device information table. The Filter Value column stores either an explicit value that forms a part of the test to be applied to the device information table, or a reference to a row of the Filter Value table 370.

A particular filter can be described in multiple rows of the Group Filter Criteria table 350. Each row of the Group Filter Criteria table 350 defines one criteria or test that is concatenated together with all other tests associated with a group and filter, by matching the Group ID and Filter Metadata ID values. Using this structure, a user can establish a descriptive name for a group of devices, and persistently store either the members of the group, or information sufficient to dynamically construct the members of the group when the user desires to have a view of the group. In this way, the user can display views of groups without entering filter criteria or selecting filter attributes more than once.

USING A FILTER DIALOG TO ESTABLISH AND MODIFY FILTERS AND DISPLAY DYNAMIC VIEWS

Figure 3:
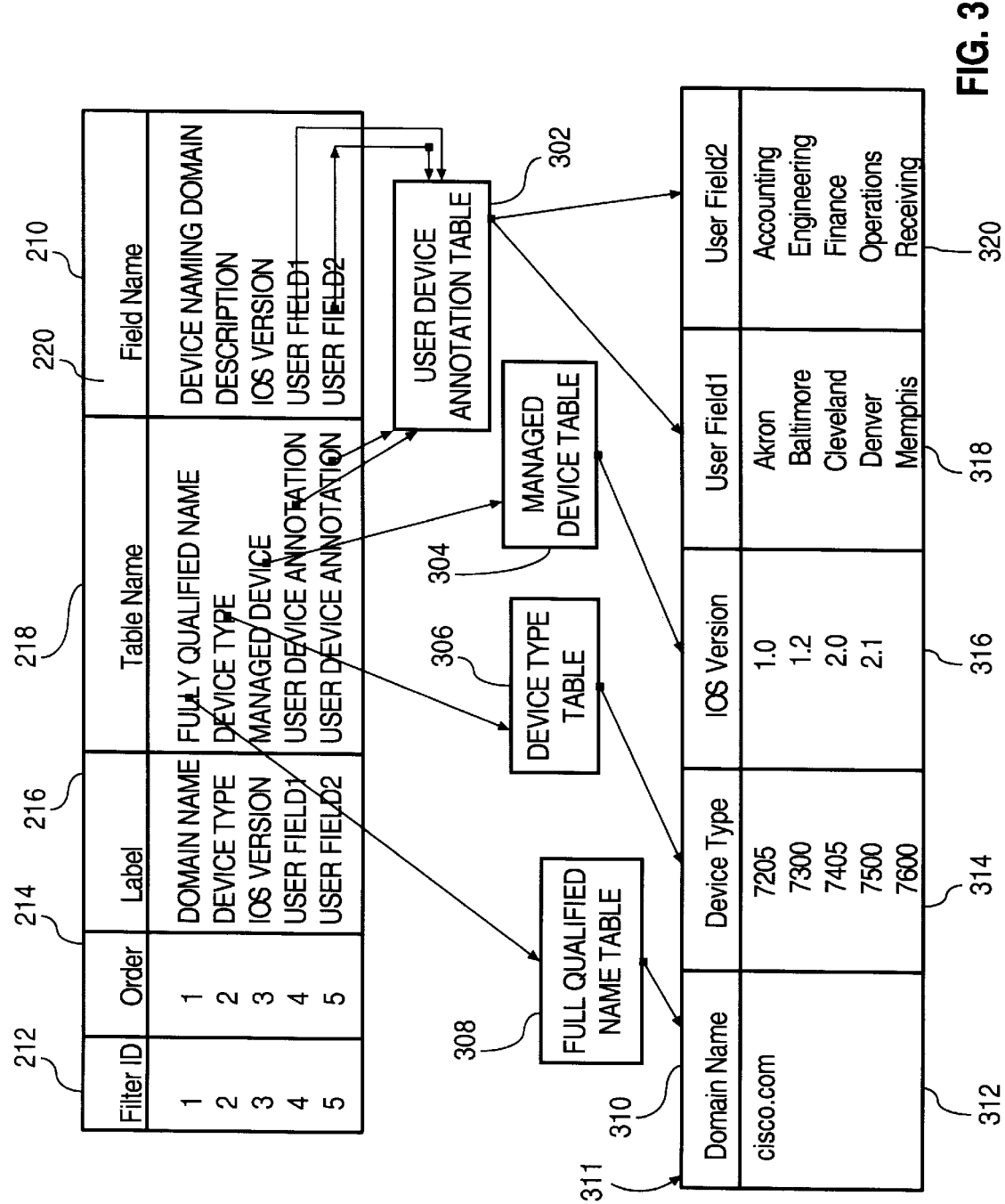
FIG. 3 is a block diagram of a mechanism for providing a view of network device information.

The Filter Metadata table 360 drives elements of a filter dialog 210, shown in FIG. 3, that represent filter choices, their order and content. This arrangement provides flexibility and extensibility in the definition of filter criteria. The term "filter dialog" refers to a set of information, presented or displayed to a user through a workstation, by which the user can engage in a dialog with the filter mechanism 126 and specify selected criteria that define members of a group or view of devices. As described further below, in an embodiment, the filter dialog 210 is tabular data presented to a user through a graphical user interface of a workstation.

In one embodiment, the filter dialog 210 has a Filter ID column 212, an Order column 214, a Label column 216, a Table Name column 218, and a Field Name column 220. An example of values presented in the filter dialog 210 based on information from the Filter Metadata table 360 is presented in Table 1 below.

TABLE 1

EXAMPLE VALUES OF FILTER DIALOG

| FILTER ID | ORDER | LABEL | TABLE NAME | FIELD NAME |
|---|---|---|---|---|
| 1 | 1 | Domain name | Fully Qualified Name | Device Naming Domain |
| 2 | 2 | Device Type | Device Type | Description |
| 3 | 3 | IOS Version | Managed Device | IOS Version |
| 4 | 4 | User Field1 | User Device Annotation | User Field1 |
| 5 | 5 | User Field2 | User Device Annotation | User Field2 |

FIG. 3 is a block diagram showing how the example values of the filter dialog 210 shown in Table 1 map to or drive the structure and content of a result set or view 310.

The Filter ID column 212 displays a unique identifier, such as an integer, for each fiter that is available in the system. The remaining columns of a row provide characteristics for the filter that is associated with the row.

The Order column 214 displays a numeric value that indicates the sequence in which a filter is displayed in a result set or view 310. The value of the Order column 214 is derived from the Filter UI Order column of the Filter Metadata table 360. For example, in Table 1, filter 1 is displayed first in the view 310 because its Order value is "1". In Table 1, only by way of example, there is a correlation between the filter identifier and the filter order, but this is not necessary. Indeed, in a complex filtering system any arbitrary filter identifier value can be associated with the first order position.

The Label column 216 displays values that are displayed as column headers in the column header row 311 of the view 310. As shown in FIG. 3, the values of the Label column 216 are displayed in the column header row 311 according to the order indicated in the Order column 214, ordered from left to right.

Each value displayed in the Table Name column 218 is the name of a table in the database 106, or another source of information that is associated with a filter. The values displayed in the view 310 are dynamically evaluated, based on the filters selected by the user from the filter dialog 210, each time the view 310 is used by the system or an application that requires a view of device information. For example, the first value in the Table Name column 218 ("Fully Qualified Name") identifies a Fully Qualified Name table 308. Values from the Fully Qualified Name table 308 are displayed in the Domain Name column 312 of the view 310. The label "Domain Name" is the first value in the Label column 216 and is associated with the first value of the Table Name column 218.

The Field Name column 220 of the filter dialog 210 displays values that identify a column of the table named in the Table Name column 218 from which values are retrieved to display in an associated column of the view 310. For example, the values in the Device Type column 314 of the view 310 are taken from the Description column of a Device Type table 306 in the database 106. This relationship is derived from the values of the second filter shown in the filter dialog 210. In the second filter (the row of the dialog 210 that has a Filter ID value of "2"), the Order value is "2" and the Label value is "Device Type." Accordingly, that label value appears in the second column of the view 310. The Table Name value is "Device Type", so values for the Device Type column 314 are taken from the Device Type table 306. The Field Name is "Description," indicating that the values for the Device Type column are taken from the "Description" column within the Device Type table 306.

As indicated by the fourth and fifth filters shown in FIG. 3, more than one filter can reference the same table. Both the fourth and fifth filters have the same table name value ("User Device Annotation") in the Table Name column 218.

While FIG. 3 shows metadata relating to five filters by way of an example, information about any number of filters can be stored in the Filter Metadata table 360 and displayed in the filter dialog 210.

In the preferred embodiment, when a table referenced in the Filter Metadata table 360 is storing the null set or no values, then a column of values from that table is not displayed in the filter dialog 210 or in the view 310. The referenced column is omitted. For example, if the filter dialog 210 displays the values shown in FIG. 3, but the User Device Annotation table 302 is found to have no values, then the User Field 1 and User Field 2 columns are not displayed.

In one embodiment, values are loaded into the Filter Metadata table 360 and displayed in the filter dialog 210 upon initialization of the filter mechanism 126. Preferably, the client or end user cannot modify the values. This is done because to ensure acceptable system performance, it is desirable to limit the scope of the filters so that the result set or view 310 is reasonable in size, finite, and rapidly assembled. However, the form and contents of the filter dialog 210 can be customized to an extent by modifying the contents of the User Device Annotation table 302 and the Filter Value table 370. The User Device Annotation table 302 has two columns, denoted User Field 1 and User Field 2, which store attributes of devices that are user-defined, customized filtering criteria such as geographic location, name of individual responsible for the device, etc. The number of user fields has been increased in other embodiments, allowing more user customization but causing slower assembly of the result set or view.

The tables referenced by the Filter Metadata table 360 can store dynamically generated data. For example, in the preferred embodiment, the third filter of the filter dialog 210 references a Managed Device table 304 that stores extensive information about devices under management of the Network Management Server 102. In this embodiment, an inventory polling process periodically polls the network 108, receives information about the network devices 118a–118c, and stores values derived from that information in a column of the Managed Device table 304 called the sysDescription column. One portion of the information stored in the sysDescription column is the version number of the input/output system (IOS) used by the device that has been polled. A separate process periodically parses values in the sysDescription column, extracts an IOS version value from that column, and stores the IOS version value in a IOS Version column of the Managed Device table 304. This dynamically created data is displayed in the IOS Version column 316 of the view 310.

Thus, the form and contents of the view 310 are determined by values displayed in the filter dialog 210 and selected by the user, based on values stored in the Filter Metadata table 360 and its related tables. The form and contents of the view 310 can be changed by selecting different values in the filter dialog 210 or by changing the contents of the Filter Metadata table 360. In this way, the Filter Metadata table provides a way for a filter mechanism to flexibly accommodate a variety of changing information. The Filter Metadata table provides a way of persistently storing classes of possible criteria that devices must satisfy in order to be included in a group of devices.

In an embodiment, the filter mechanism 126 reads the values of the filter dialog 210, interprets the values stored in the table, retrieves values referenced in the Filter Metadata table 360, and causes the referenced values to be displayed in the view 310.

In one embodiment, the filter dialog 210 is displayed in a window of the client 104 under control of the inventory collection 114, or any other application program that provides a device group display function. Initially, none of the values in the filter dialog 210 is selected. A user selects filter criteria by pointing a cursor at values that are displayed in the filter dialog 210 and clicking on desired values. The filter mechanism 126 receives the selected values, and assembles a database query based on the values. In this way, the filter mechanism receives user input that defines a device group by receiving a specification of particular criteria that devices in the device group must satisfy.

In this embodiment, the query preferably is a statement in the Structured Query Language (SQL) and the database is a database server that can receive, interpret, and respond to SQL queries. Alternatively, any selection mechanism using a regular grammar can be used. Preferably, selection of multiple filter values causes the database query to be assembled using Boolean values to relate the filter values. In particular, when multiple filter values are selected from the same column of the filter dialog 210, they are related in the database query using a logical OR. Further, if filter values are selected from multiple different columns of the filter dialog 210, they are related in the database query using a logical AND.

For example, if Device Type values 7300 and 7500 are both selected by a user from the filter dialog 210, the filter mechanism 126 interprets the user's selection as requesting information about all network devices that are 7300 or 7500 type devices. As a second example, when Device Type values 7300 and 7500 are selected, and IOS Versions 10.3 and 11.1 also are selected, the filter mechanism 126 interprets the selections as requesting information about devices that are type 7300 or 7500 and that run IOS software version 10.3 or version 11.1.

The filter mechanism 126 applies the query to the database, which stores a superset of network device information. In response, the filter mechanism 126 receives a subset of information, such as a set of device identifiers and device descriptions that relate to a group of devices. The filter mechanism 126 displays the subset of information in a device list or view 310. The device list or view 310 provides a selected view of network device information.

In this way, the filter mechanism resolves membership of devices in a device group dynamically, by determining the current membership of the device group based upon the criteria for membership in the group, and based upon information about devices that currently exist in the network.

DEFINING AND PERSISTENTLY STORING VIEWS AND DISPLAYING A DYNAMIC VIEW

Alternatively, the Filter Metadata table 360 and the related tables are used to pre-define filters that are persistently stored and can be retrieved by name. The names are called "group names". After a filter is established in the filter dialog 210, it can be saved and identified using a descriptive name, so that it can be retrieved and re-used later. Each time a filter is retrieved, it is re-evaluated, by constructing a query and applying it to the database 106. Thus, each view generated from a filter is dynamic. In this context, "dynamic" means that the members of the view are determined or re-evaluated whenever the view is requested. This technique is a distinct improvement upon static views, in which members of a view are fixed, and define-time dynamic views, in which members of a view are determined once and only once when a view is first defined.

Table 2, Table 3, and Table 4 below illustrate the organization of exemplary information in the Device Group table 330, Filter Metadata table 360, Group Filter Criteria table 350 that can be used to generate a query result which enumerates those device information.

TABLE 2

FILTER METADATA TABLE

| Filter MD Id | UI Label ID | Filter UI Order | Filter Ftable PK | Filter Sec Query | Filter Opt Query |
|---|---|---|---|---|---|
| 1 | 1 | 1 | Domain_Id | SELECT M.Device_id FROM MANAGED_DEV AS M, DEV_FQN AS F WHERE M.Device_Id=F.Device_Id and | |

TABLE 2-continued

FILTER METADATA TABLE

| Filter MD Id | UI Label ID | Filter UI Order | Filter Ftable PK | Filter Sec Query | Filter Opt Query |
|---|---|---|---|---|---|
| 2 | 2 | 2 | Device_Type_Id | F SELECT Device_Id FROM MANAGED_DEV WHERE MANAGED_DEV | |
| 3 | 3 | 3 | IOS_Version | SELECT Device_Id FROM DEV_SNMP_SYS WHERE DEV_SNMP_SYS | OS_Version |

TABLE 3

DEVICE GROUP TABLE

| Group ID | Group Name | Group Scope | Group Attributes | Group Description | Updated At |
|---|---|---|---|---|---|
| 1000 | All Routers | 1 | 1 | All routers in all networks | 1997-11-10 20:08:41.00 |
| 10001 | Purchased running 11.X | 1 | 3 | Devices we have purchased that run some version of IOS 11 | 1997-12-03 17:20:23.00 |

TABLE 4

GROUP FILTER CRITERIA TABLE

| Group Filter ID | Filter MD ID | Group ID | Filter Type | Filter Value |
|---|---|---|---|---|
| 330 | 3 | 10001 | IN | 11.0(12) |
| 331 | 3 | 10001 | IN | 11.2(2.1) |
| 332 | 3 | 10001 | IN | 11.2(2.2) |

The foregoing example data defines a device group named "Purchased running 11.X" that is a typical dynamic filter. When the filter is dynamically evaluated against a table of device information, the filter mechanism 126 will display a view of all devices in the network that were purchased running some version of the IOS version 11 operating system software.

A dynamic view or filter is invoked in the context of a network inventory application program that provides a device view function. For example, the user is running an inventory collection application on the client 104 that communicates with the inventory collection server 122. The inventory collection application executes a function that displays a view of network devices. The function invokes the filter mechanism 126.

The filter mechanism 126 displays a list of the names of pre-defined, persistently stored filters, one of which is "Purchased running 11.X." The user selects that filter and instructs the application to display a view as defined by that filter. In response, the filter mechanism 126 retrieves basic information about the "Purchased running 11.X" filter, stored in the second data row of Table 3. The group identifier "10001" is assigned to the filter. The filter mechanism looks in Table 4 and locates all rows having a matching value "10001" stored in the Group ID column of Table 4. The filter mechanism 126 initializes storage for a new SQL statement. The filter mechanism 126 retrieves the Filter MD ID value in Table 4 for each row having a matching Group ID value of "10001".

In the example of Table 4, the corresponding Filter MD ID value is "3" Accordingly, the filter mechanism 126 looks up the value "3" in the Filter MD Id column of Table 2. From each matching row, the filter mechanism 126 retrieves the value of the Filter Sec Query column and appends it to the current SQL statement. Returning to Table 4, the filter mechanism 126 appends the values of the Filter Type and Filter Value columns to the current SQL statement, joined by a logical OR operator. For example, after the filter mechanism 126 processes the rows of Table 4 having a Group Filter ID value of "330", "331", and "332", the current SQL statement would have a value of:

SELECT Device_Id FROM DEV_SNMP_SYS WHERE
DEV_SNMP_SYS.IOS_Version IN ('11.0(12)') OR
DEV_SNMP_SYS.IOS_Version IN ('11.2(2.1)') OR
DEV_SNMP_SYS.IOS_Version IN ('11.2(2.2)')

When the filter mechanism 126 detects a change in the Filter MD ID value of Table 4 for the current Group ID value, the next Filter Type and Filter Value values are joined to the current SQL statement using an AND operator. If other rows with other Filter MD ID values exist, then multiple queries are constructed. This process continues until all rows in Table 4 that have a Group ID value matching the current group identifier ("10001") are evaluated.

When all rows of Table 4 are processed, one or more SQL statements will have been constructed. They are forwarded to the database for evaluation against a table of device information. The result set provided by the database is formatted and displayed as a dynamic view 310. When multiple queries are constructed, the result set represents the intersection of the results of the queries.

DEVICE INFORMATION FILTERING METHOD

Figure 4A:
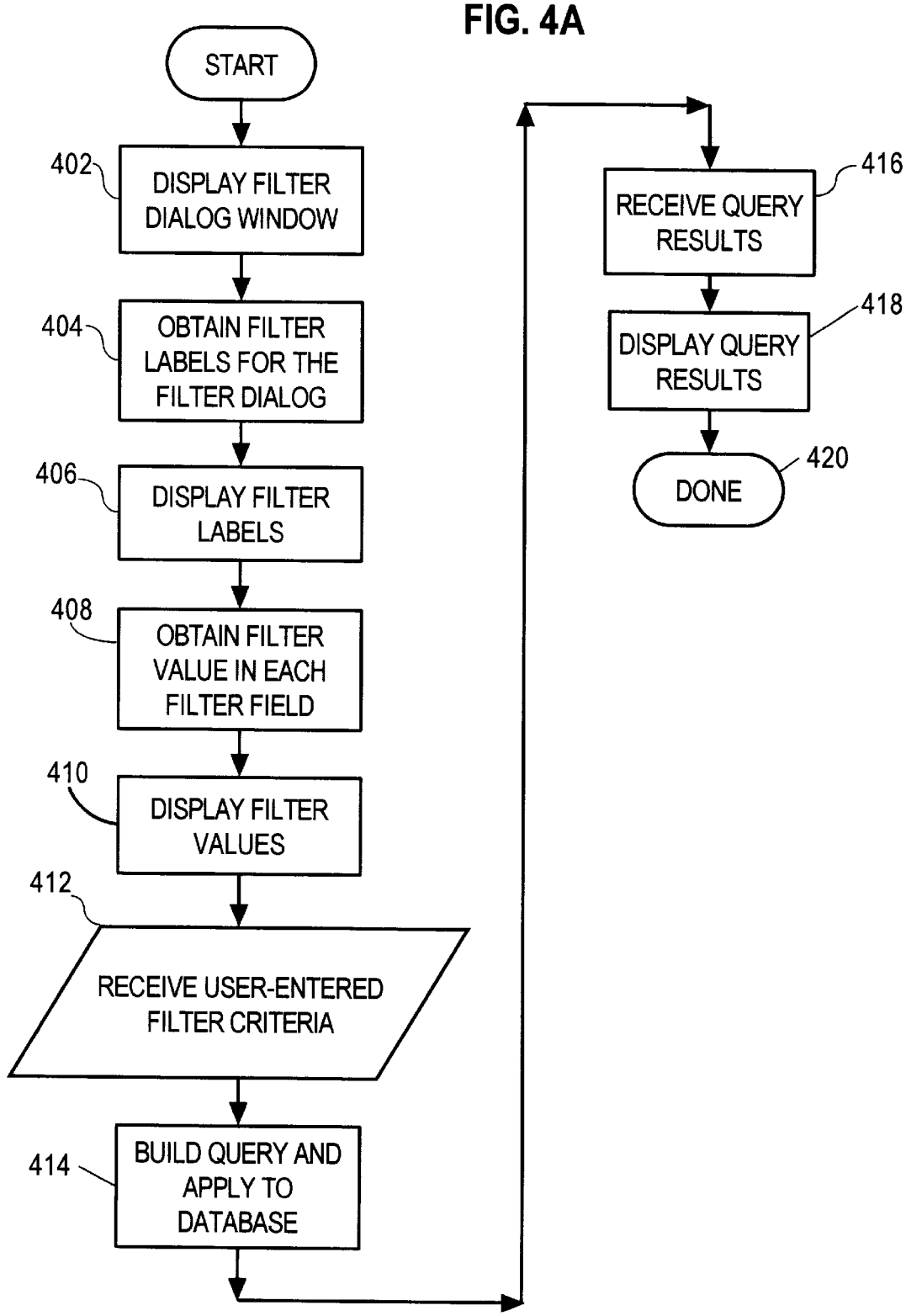
FIG. 4A is a flow diagram of a first embodiment of a method of providing a view of network device information.
Figure 4B:
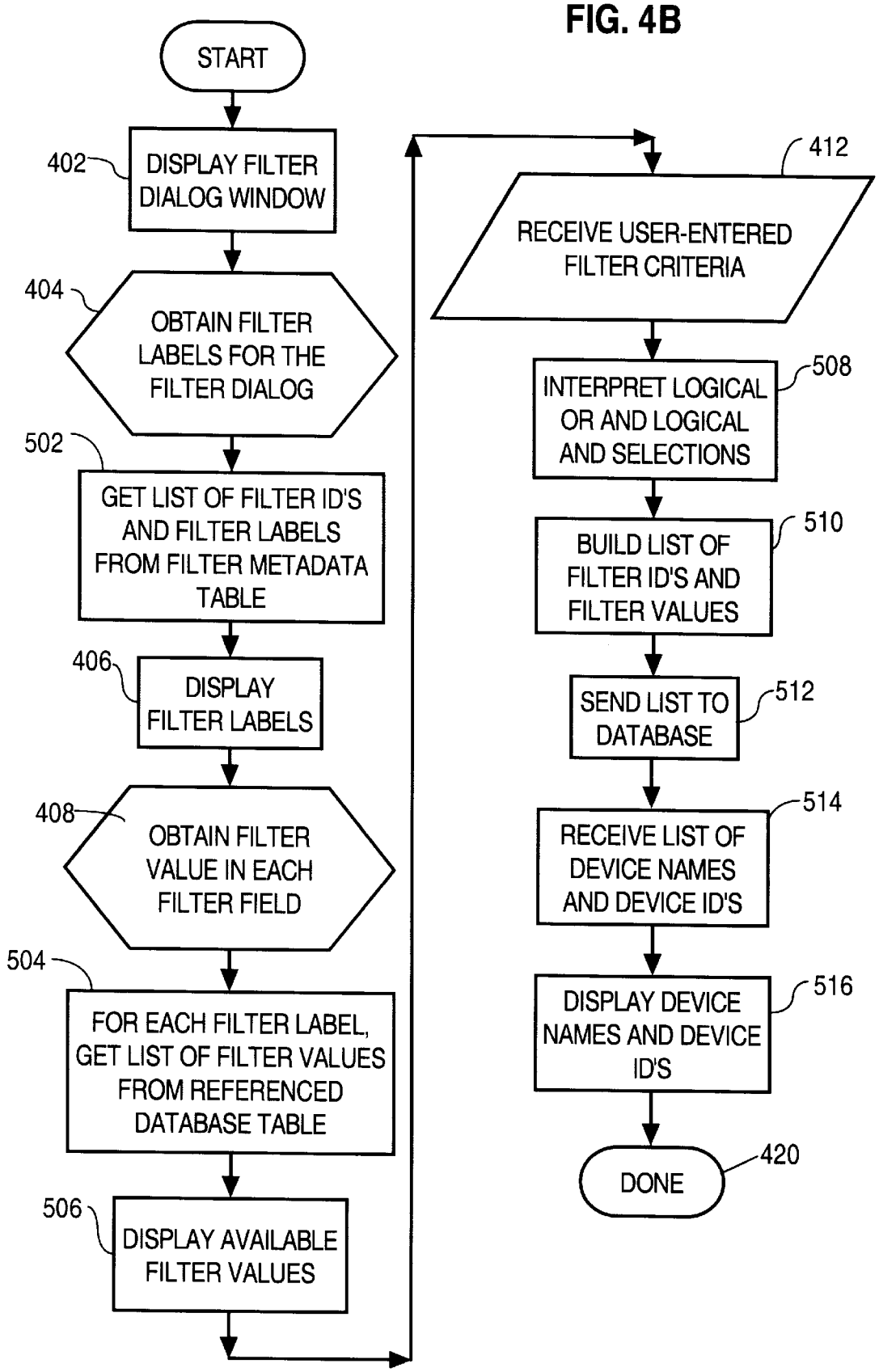
FIG. 4B is a flow diagram of a second embodiment of a method of providing a view of network device information.
Figure 5:
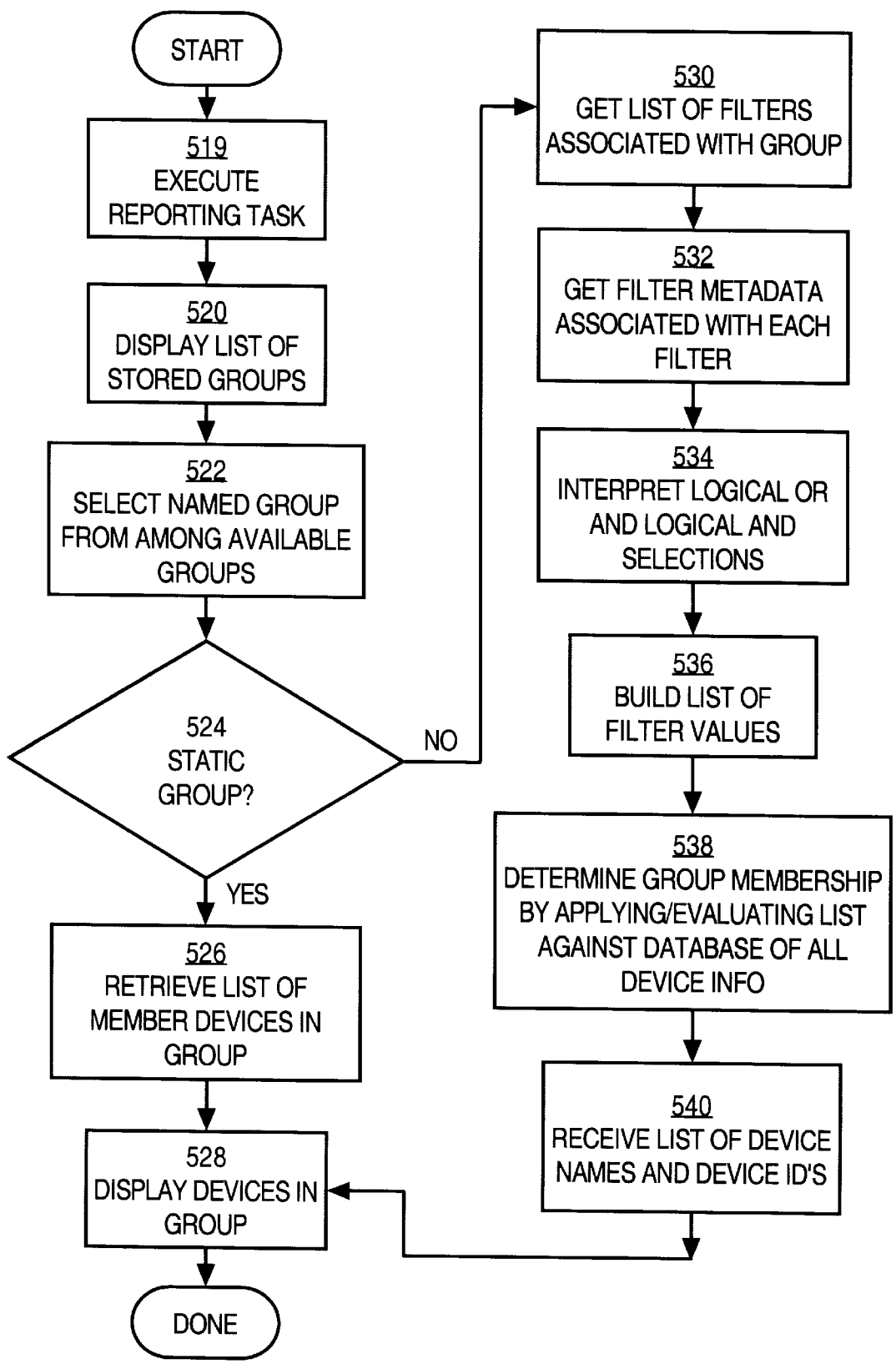
FIG. 5 is a flow diagram of a third embodiment of a method of providing a view of network device information.

FIG. 4A, FIG. 4B, and FIG. 5 are flow diagrams of embodiments of a method of filtering network device information and displaying a view of selected network device information.

Referring first to FIG. 4A, as shown in block 402, a filter dialog window is displayed, for example, by the application 114. The filter dialog window is an area within a screen display of the client 104 in which the filter dialog 210 is displayed.

In block 404, the method obtains a set of filter labels for the filter dialog 210. The filter labels are used to designate or label columns of the filter dialog that will contain data values that can be selected to create a filter query. In block 406, the filter labels are displayed in the filter dialog. Preferably, block 406 includes the substep of checking whether any values for the filter label exist in the database. In this embodiment, blocks 406–08 are skipped when no values are being stored for an attribute, so that the user cannot select that attribute.

In block 408, filter values are obtained for each field or column of the filter dialog. Preferably, a query is issued to a database table that is associated with a field or column, and values for the field or column are retrieved from that table. In block 410, the filter values are displayed in the filter dialog in association with labels of the filters. As a result, the filter dialog provides a display of persistently stored values that can be used to define criteria that devices must satisfy in order to be included in a device group.

In block 412, the method receives filter criteria entered by a user. The filter criteria include one or more filter values that have been selected by the user. Thus, the user provides input that defines a device group, by specifying particular criteria that devices in the device group must satisfy. In the preferred embodiment, the filter values or criteria data entered by the user are transiently stored for temporary use by remaining steps of the method. In an alternate embodiment, the filter values are persistently stored in a database so that they can be later recalled and re-used.

The method next compares the group criteria data that has been received from the user against device data about devices that currently exist in the network. In block 414, a database query is constructed and applied to a database of network information. For example, a SQL statement is prepared based upon the filter values, and forwarded to a database server for processing. In block 416, the results of the database query are received. In block 418, the results are displayed in a device list or view that shows a subset of information in the database. In block 420, the method is complete.

Referring now to FIG. 4B, in blocks 402 and 404, the embodiment of FIG. 4B carries out the same functions as shown in the like numbered blocks of FIG. 4A. In block 502, the step of obtaining filter labels for the filter dialog that is shown in block 404 is carried out by retrieving a list of filter identifiers and filter labels from a Filter Metadata table. In one embodiment, the step indicated in block 502 is carried out in a computer program or method, that requests the database server to browse through the Filter Metadata table. In response, the database server returns, a list of filter identifiers and a filter label associated with each of the filter identifiers.

In block 406, the filter labels received from the database server are displayed. Block 408 indicates that filter values are obtained for each filter field. In the embodiment of FIG. 4B, the step shown in block 408 includes the steps shown in block 504. In block 504, for each filter label, a list of filter values is retrieved from a database table that is referenced in the Filter Metadata table. In one embodiment, this is done by calling a function of the database server, using a function call of the database API, and passing the filter identifier as a parameter to the function call. In response, the database server returns a list of filter values, for example, in array that is a parameter to the function call. The filter values are displayed in the filter dialog, as shown in block 506. These sub-steps are repeated for each of the filter identifiers referenced in the Filter Metadata table.

In block 412, user-entered filter criteria are received. For example, this step involves waiting for a user to point a cursor at a filter value and select it by clicking on it. When all the selected filter values are received, in block 508 the method interprets the logical relationship of the selected filter values. For example, if multiple filter values are selected in the same column of the filter dialog, the selected values are related using a logical OR. If multiple filter values are selected in different columns of the filter dialog, the selected values are related using a logical AND.

In block 510, the method builds a query by assembling a list of filter identifiers and filter values. As shown in block 512, the list of filter identifiers and filter values is sent to the database. In the preferred embodiment, the filter mechanism calls a function of the database API and provides, as a parameter to the function call, a two-dimensional array having rows correlated to filter identifiers and columns containing filter values. In block 514, the filter mechanism receives a list of device names and device identifiers from the database. In the preferred embodiment, the database server returns a set of results for the query in the form of a two-dimensional array that is passed back through the database API. The array contains a list of device names and device identifiers for devices that match the query criteria.

In block 516, the device names and device identifiers that have been received from the database are displayed in a device view.

FIG. 5 shows an embodiment of a method of generating a dynamic view of network information using a persistently stored filter.

In block 519, a reporting task is executed. For example, the inventory collection application 114 is executed, and the application reaches an execution point that involves displaying a view of selected network devices. Accordingly, the filter mechanism 126 is invoked to carry out device information filtering and to display an appropriate view. In block 520, the filter mechanism displays a list of stored groups by group name. Preferably, the display of block 520 is done in a window of a graphical user interface so that the user can easily select one of the groups by clicking on its name. The user selects one of the named groups in block 522.

In block 524, the filter mechanism tests whether the selected group has static members or dynamic members. In this context, "member" refers to a device that matches the filter criteria associated with the group, and therefore is logically within the group. If the group has static members, then in block 526 the filter mechanism retrieves a list of member devices within the static group. In an embodiment, block 526 involves retrieving an identifier of the current group, and looking up rows of a group members table that have a group identifier matching the current group identifier. A device identifier value is retrieved from each matching row and used as an index to look up further device information in other tables.

If the group is a dynamic group, then the test of block 524 is negative, and in block 530 the filter mechanism retrieves a list of filters associated with the selected group. In block 532, the filter mechanism obtains filter metadata associated with each filter that is associated with the selected group. In block 534, the filter mechanism constructs a database query by interpreting the filter metadata and list of filters, joining the statement with appropriate logical AND and OR operators. In block 536, the filter mechanism builds a list of filter identifiers and filter values that form a part of the query.

In block 538, the members of the group are dynamically determined. In the preferred embodiment, the filter mechanism applies the query or list against a device information table or database. In block 540, the filter mechanism receives a list of device names and identifiers returned to it by the database in response to the query.

In block 528, for either static or dynamic groups, information about the devices in group is displayed to the user. Preferably, the information is organized in a tabular format. In one embodiment, the format of the view 310 shown in FIG. 3 is used.

HARDWARE OVERVIEW

Figure 6:
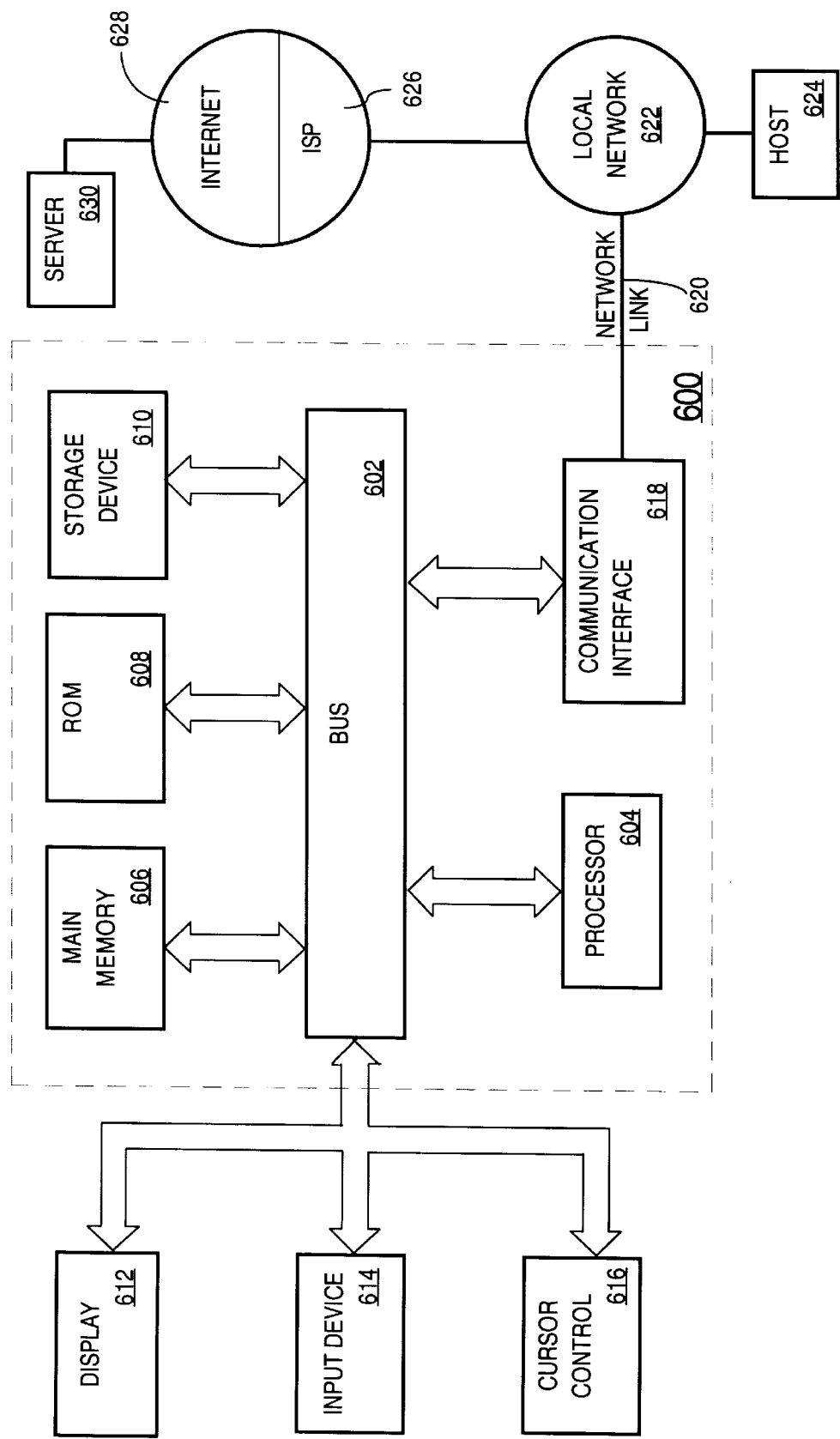
FIG. 6 is a block diagram of a computer system hardware arrangement that can be used to implement the invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for collecting network device information and detecting changes in the information. According to one embodiment of the invention, mechanisms and processes for collection network device information and detecting changes in the information are provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, RAM, PROM, EPROM, FLASH-EPROM, any other memory chip or cartridge, a carrier wave as described hereinafter, or any other medium from which a computer can read information.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector coupled to bus 602 can receive the data carried in the infra-red signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides mechanisms and methods for collecting network device information and detecting changes in the information, as described herein.

The received code may be executed by processor 604 as it is received, and/or stored in storage device 610, or other non-volatile storage for later execution. In this manner, computer system 600 may obtain application code in the form of a carrier wave.

MODIFICATIONS AND CHANGES TO EMBODIMENTS

In the foregoing specification, the invention has been described with reference to specific embodiments thereof. It will, however, be evident that various modifications and changes may be made thereto without departing from the broader spirit and scope of the invention.

For example, in discussing the preferred embodiment, it has been convenient to refer to queries that use the structured query language. However, the invention is not limited to that context, and can be used with other suitable database query methods. In addition, while a particular structure for a Filter Metadata table has been disclosed, other structures are contemplated within the scope of the invention. For example, filter metadata information can be stored in other data structures such as arrays and linked lists. Further, although a particular embodiment of columns and values have been disclosed for the Filter Metadata table, other information about filters or the filter dialog can be stored in the table. For example, the Filter Metadata table can store a description of constraints on the combination of particular filters in a user query.

The specification and drawings are, accordingly, to be regarded in an illustrative rather than a restrictive sense.

What is claimed is:

1. A method for establishing groups of logical objects, the method comprising the steps of:
    storing group criteria data that represents available criteria that may be used to define one of the groups;
    receiving user input that defines one of the groups by specifying a subset of said group criteria data that logical objects in the group must satisfy;
    responding to a request to view that group by determining current membership of that group by retrieving the group criteria data from a database and comparing the subset of said group criteria data against device data about all the logical objects.

2. The method recited in claim 1, wherein the method further includes the steps of
    establishing one or more user-defined fields within the group criteria data for specifying information about the objects; and
    receiving user input that specifies particular values for the user-defined fields for particular objects among all the objects.

3. The method recited in claim 2, wherein the step of receiving user input that defines the group includes the step of receiving user input that specifies criteria for at least one of the user-defined fields.

4. The method recited in claim 1, wherein the step of storing group criteria data further comprises the step of storing a table of metadata that describes the group criteria data.

5. The method recited in claim 4, wherein the step of storing the table of metadata further comprises the step of storing in the table of metadata a plurality of filters for information about the logical objects.

6. The method recited in claim 5, wherein the step of storing a plurality of filters further comprises the steps of storing, for each filter defined in said table of metadata, an order of display value, a filter label value, and a reference to a data source for values of said filter.

7. The method recited in claim 6, wherein the step of storing a reference to a data source for said values comprises the steps of storing, for each filter defined in said table, a table name that identifies a filter value source table and a column name that identifies a column of the filter value source table from which said values of said filter are derived.

8. The method recited in claim 5, wherein the step of receiving user input comprises the step of receiving a user selection of a plurality of the filters that are related by Boolean logic.

9. The method recited in claim 8, wherein the step of responding to a request to view said device group by determining current membership of the group includes the steps of:
    building a list of said plurality of filters, the list comprising, for each filter in said plurality of filters, a filter identifier and a filter value;
    associating said plurality of filters with a Boolean logical relationship; and
    constructing a structured query language statement using said plurality of filters and said Boolean logical relationship.

10. The method recited in claim 9, wherein the step of comparing the subset of the group criteria data includes the steps of:
    applying the structured query language statement to the database;
    receiving, in response thereto, a result list comprising a plurality of pairs of device names and device identifiers of logical objects that are in the group.

11. A method for establishing groups of devices in a network, the method comprising the steps of:
    receiving user input that defines a device group by specifying particular criteria that devices in said device group must satisfy;
    persistently storing group criteria data that represents said particular criteria in a database;
    responding to requests to perform operations involving said device group by determining current membership of said device group by retrieving said group criteria data from said database; and
    comparing said group criteria data against device data about devices that currently exist in said network.

12. The method of claim 11 wherein the method further includes the steps of
    establishing one or more user-defined fields for specifying information about said devices; and
    receiving user input that specifies particular values for said user-defined fields for particular devices in said network.

13. The method of claim 12, wherein the step of receiving user input that defines a device group by specifying particular criteria includes the step of receiving user input that specifies criteria for at least one of said user-defined fields.

14. A computer-readable medium carrying one or more sequences of instructions for network device information collection, wherein execution of the one or more sequences of instructions by one or more processors causes the one or more processors to perform the steps of:

storing group criteria data that represents available criteria that may be used to define a device group;

receiving user input that defines said device group by specifying a subset of said group criteria data that devices in said device group must satisfy;

responding to a request to view said device group by determining current membership of said device group by retrieving said group criteria data from said database; and comparing said subset of said group criteria data against device data about devices that currently exist in said network.

15. The computer-readable medium recited in claim 14, in which execution of the one or more sequences of instructions further causes the one or more processors to perform the steps of:

establishing one or more user-defined fields within the group criteria data for specifying information about the objects; and receiving user input that specifies particular values for the user-defined fields for particular objects among all the objects.

16. The computer-readable medium recited in claim 15, wherein the step of receiving user input that defines the group includes the step of receiving user input that specifies criteria for at least one of the user-defined fields.

17. The computer-readable medium recited in claim 14, wherein the step of storing group criteria data further comprises the step of storing a table of metadata that describes the group criteria data.

18. The computer-readable medium recited in claim 17, wherein the step of storing the table of metadata further comprises the step of storing in the table of metadata a plurality of filters for information about the logical objects.

19. The computer-readable medium recited in claim 18, wherein the step of storing a plurality of filters further comprises the steps of storing, for each filter defined in said table of metadata, an order of display value, a filter label value, and a reference to a data source for values of said filter.

20. The computer-readable medium recited in claim 19, wherein the step of storing a reference to a data source for said values comprises the steps of storing, for each filter defined in said table, a table name that identifies a filter value source table and a column name that identifies a column of the filter value source table from which said values of said filter are derived.

21. The computer-readable medium recited in claim 19, wherein the step of receiving user input comprises the step of receiving a user selection of a plurality of the filters that are related by Boolean logic.

22. The computer-readable medium recited in claim 21, wherein the step of responding to a request to view said device group by determining current membership of the group includes the steps of:

building a list of said plurality of filters, the list comprising, for each filter in said plurality of filters, a filter identifier and a filter value;

associating said plurality of filters with a Boolean logical relationship; and constructing a structured query language statement using said plurality of filters and said Boolean logical relationship.

23. The computer-readable medium recited in claim 22, wherein the step of comparing the subset of the group criteria data includes the steps of:

applying the structured query language statement to the database;

receiving, in response thereto, a result list comprising a plurality of pairs of device names and device identifiers of logical objects that are in the group.

24. A computer data signal embodied in a carrier wave, the computer data signal carrying one or more sequences of instructions for network device information collection, wherein execution of the one or more sequences of instructions by one or more processors causes the one or more processors to perform the steps of:

persistently storing, in a database, group criteria data that represents available criteria that may be used to define a device group;

receiving user input that defines said device group by specifying a subset of said group criteria data that devices in said device group must satisfy;

responding to a request to view said device group by determining current membership of said device group by retrieving said group criteria data from said database; and comparing said subset of said group criteria data against device data about devices that currently exist in said network.

25. The computer data signal recited in claim 24, in which execution of the one or more sequences of instructions further cause the one or more processors to carry out the steps of:

establishing one or more user-defined fields within the group criteria data for specifying information about the objects; and receiving user input that specifies particular values for the user-defined fields for particular objects among all the objects.

26. The computer data signal recited in claim 25, wherein the step of receiving user input that defines the group includes the step of receiving user input that specifies criteria for at least one of the user-defined fields.

27. The computer data signal recited in claim 26, wherein the step of persistently storing group criteria data further comprises the step of storing a table of metadata that describes the group criteria data.

28. The computer data signal recited in claim 27, wherein the step of storing the table of metadata further comprises the step of storing in the table of metadata a plurality of filters for information about the logical objects.

29. The computer data signal recited in claim 28, wherein the step of storing a plurality of filters further comprises the steps of storing, for each filter defined in said table of metadata, an order of display value, a filter label value, and a reference to a data source for values of said filter.

30. The computer data signal recited in claim 29, wherein the step of storing a reference to a data source for said values comprises the steps of storing, for each filter defined in said table, a table name that identifies a filter value source table and a column name that identifies a column of the filter value source table from which said values of said filter are derived.

31. The computer data signal recited in claim 29, wherein the step of receiving user input comprises the step of receiving a user selection of a plurality of the filters that are related by Boolean logic.

32. The computer data signal recited in claim 31, wherein the step of responding to a request to view said device group by determining current membership of the group includes the steps of:

building a list of said plurality of filters, the list comprising, for each filter in said plurality of filters, a filter identifier and a filter value;

associating said plurality of filters with a Boolean logical relationship; and constructing a structured query language statement using said plurality of filters and said Boolean logical relationship.

33. The computer data signal recited in claim 32, wherein the step of comparing the subset of the group criteria data includes the steps of:

applying the structured query language statement to the database;

receiving, in response thereto, a result list comprising a plurality of pairs of device names and device identifiers of logical objects that are in the group.

34. A computer apparatus comprising:

a processor; and a memory coupled to the processor, the memory containing one or more sequences of instructions for network device information collection, wherein execution of the one or more sequences of instructions by the processor causes the processor to perform the steps of:

persistently storing, in a database, group criteria data that represents available criteria that may be used to define a device group;

receiving user input that defines said device group by specifying a subset of said group criteria data that devices in said device group must satisfy;

responding to a request to view said device group by determining current membership of said device group by retrieving said group criteria data from said database; and comparing said subset of said group criteria data against device data about devices that currently exist in said network.

35. The computer apparatus recited in claim 34, in which execution of the sequences of instructions by the one or more processors causes the one or more processors to carry out the further steps of:

establishing one or more user-defined fields within the group criteria data for specifying information about the objects; and receiving user input that specifies particular values for the user-defined fields for particular objects among all the objects.

36. The computer apparatus recited in claim 35, wherein the step of receiving user input that defines the group includes the step of receiving user input that specifies criteria for at least one of the user-defined fields.

37. The computer apparatus recited in claim 36, wherein the step of storing group criteria data further comprises the step of storing a table of metadata that describes the group criteria data.

38. The computer apparatus recited in claim 37, wherein the step of storing the table of metadata further comprises the step of storing in the table of metadata a plurality of filters for information about the logical objects.

39. The computer apparatus recited in claim 38, wherein the step of storing a plurality of filters further comprises the steps of storing, for each filter defined in said table of metadata, an order of display value, a filter label value, and a reference to a data source for values of said filter.

40. The computer apparatus recited in claim 39, wherein the step of storing a reference to a data source for said values comprises the steps of storing, for each filter defined in said table, a table name that identifies a filter value source table and a column name that identifies a column of the filter value source table from which said values of said filter are derived.

41. The computer apparatus recited in claim 40, wherein the step of receiving user input comprises the step of receiving a user selection of a plurality of the filters that are related by Boolean logic.

42. The computer apparatus recited in claim 41, wherein the step of responding to a request to view said device group by determining current membership of the group includes the steps of:

building a list of said plurality of filters, the list comprising, for each filter in said plurality of filters, a filter identifier and a filter value;

associating said plurality of filters with a Boolean logical relationship; and constructing a structured query language statement using said plurality of filters and said Boolean logical relationship.

43. The computer apparatus recited in claim 42, wherein the step of comparing the subset of the group criteria data includes the steps of:

applying the structured query language statement to the database;

receiving, in response thereto, a result list comprising a plurality of pairs of device names and device identifiers of logical objects that are in the group.

44. A computer apparatus configured to carry out automated network device information collection, and comprising:

means for persistently storing, in a database, group criteria data that represents available criteria that may be used to define a device group;

means for receiving user input that defines said device group by specifying a subset of said group criteria data that devices in said device group must satisfy;

means for responding to a request to view said device group by determining current membership of said device group by retrieving said group criteria data from said database; and means for comparing said subset of said group criteria data against device data about devices that currently exist in said network.

45. The computer apparatus recited in claim 44, further comprising:

means for establishing one or more user-defined fields within the group criteria data for specifying information about the objects; and means for receiving user input that specifies particular values for the user-defined fields for particular objects among all the objects.

46. The computer apparatus recited in claim 45, wherein the means for receiving user input that defines the group includes a means for receiving user input that specifies criteria for at least one of the user-defined fields.

47. The computer apparatus recited in claim 46, wherein the means for storing group criteria data further comprises a means for storing a table of metadata that describes the group criteria data.

48. The computer apparatus recited in claim 47, wherein the means for storing the table of metadata further comprises a means for storing in the table of metadata a plurality of filters for information about the logical objects.

49. The computer apparatus recited in claim 48, wherein the means for storing a plurality of filters further comprises a means for storing, for each filter defined in said table of metadata, an order of display value, a filter label value, and a reference to a data source for values of said filter.

50. The computer apparatus recited in claim 49, wherein the means for storing a reference to a data source for said values comprises a means for storing, for each filter defined in said table, a table name that identifies a filter value source table and a column name that identifies a column of the filter value source table from which said values of said filter are derived.

51. The computer apparatus recited in claim 50, wherein the means for receiving user input comprises a means for receiving a user selection of a plurality of the filters that are related by Boolean logic.

52. The computer apparatus recited in claim 51, wherein the means for responding to a request to view said device group by determining current membership of the group includes a means for building a list of said plurality of filters, the list comprising, for each filter in said plurality of filters, a filter identifier and a filter value; a means for associating said plurality of filters with a Boolean logical relationship; and a means for constructing a structured query language statement using said plurality of filters and said Boolean logical relationship.

53. The computer apparatus recited in claim 52, wherein the means for comparing the subset of the group criteria data includes a means for applying the structured query language statement to the database; and a means for receiving, in response thereto, a result list comprising a plurality of pairs of device names and device identifiers of logical objects that are in the group.

54. A computer apparatus for establishing groups of devices in a network, comprising:

means for receiving user input that defines a device group by specifying particular criteria that devices in said device group must satisfy;

means for persistently storing group criteria data that represents said particular criteria in a database;

means for responding to requests to perform operations involving said device group by determining current membership of said device group by retrieving said group criteria data from said database; and means for comparing said group criteria data against device data about devices that currently exist in said network.

\* \* \* \* \*

UNITED STATES PATENT AND TRADEMARK OFFICE
CERTIFICATE OF CORRECTION

PATENT NO. : 6,295,527 B1
APPLICATION NO. : 09/023598
DATED : September 25, 2001
INVENTOR(S) : John McCormack, Mark Sapsford and Vidya Babu It is certified that error appears in the above-identified patent and that said Letters Patent is hereby corrected as shown below:

Claim 9, column 20, line 21, "device group" is changed to --group--.

Claim 14, column 21, line 11-12, "said database" is changed to --a database--.

Claim 15, column 21, line 22, "objects" is changed to --devices--; line 24, "objects" is changed to --devices--; line 25, "objects" is changed to --devices--.

Claim 18, column 21, line 37, "logical objects" is changed to --devices--.

Claim 23, column 22, line 8, "logical objects" is changed to --devices--.

Claim 24, column 22, line 25-26, "said network" is changed to --a network--.

Claim 25, column 22, line 34, "objects" is changed to --devices--; line 36, "objects" is changed to --devices--; line 37, "objects" is changed to --devices--.

Claim 28, column 22, line 49, "logical objects" is changed to --devices--.

Claim 33, column 23, line 8, "logical objects" is changed to --devices--.

Claim 34, column 23, line 37, "said network" is changed to --a network--.

Claim 35, column 23, line 43, "objects" is changed to --devices--; line 45, "objects" is changed to --devices--; line 46, "objects" is changed to --devices--.

Claim 38, column 23, line 58, "logical objects" is changed to --devices--.

Claim 43, column 24, line 27, "logical objects" is changed to --devices--.

Claim 44, column 24, line 45, "said network" is changed to --a network--.

Claim 45, column 24, line 48, "objects" is changed to --devices--; line 50, "objects" is changed to --devices--; line 51, "objects" is changed to --devices--.

Claim 48, column 24, line 63, "logical objects" is changed to --devices--.

UNITED STATES PATENT AND TRADEMARK OFFICE
CERTIFICATE OF CORRECTION

PATENT NO. : 6,295,527 B1
APPLICATION NO. : 09/023598
DATED : September 25, 2001
INVENTOR(S) : John McCormack, Mark Sapsford and Vidya Babu It is certified that error appears in the above-identified patent and that said Letters Patent is hereby corrected as shown below:

Claim 53, column 26, line 6, "logical objects" is changed to --devices--.

Signed and Sealed this

Eleventh Day of September, 2007

JON W. DUDAS
*Director of the United States Patent and Trademark Office*